United States Patent [19]
Sato et al.

[11] Patent Number: 5,730,832
[45] Date of Patent: Mar. 24, 1998

[54] ULTRASONIC VIBRATION BONDING MACHINE

[75] Inventors: Shigeru Sato; Mitsugu Katsumi; Seiya Nakai, all of Fukuoka-ken, Japan

[73] Assignee: Ultex Corporation, Fukuoka-ken, Japan

[21] Appl. No.: 699,863

[22] Filed: Aug. 20, 1996

[30] Foreign Application Priority Data

Aug. 22, 1995 [JP] Japan .................................. 7-213471
Jul. 5, 1996 [JP] Japan .................................. 8-176726

[51] Int. Cl.$^6$ ........................................... B32B 31/20
[52] U.S. Cl. .................. 156/499; 156/73.1; 156/580.1; 156/583.1; 425/174.2
[58] Field of Search ........................ 156/73.1, 73.5, 156/82, 497, 580, 580.1, 580.2, 583.1, 499; 264/68, 442, 443, 445; 425/174.2

[56] References Cited

U.S. PATENT DOCUMENTS

| | | | |
|---|---|---|---|
| 3,752,380 | 8/1973 | Shoh | 228/1.1 |
| 4,462,849 | 7/1984 | MacLaughlin et al. | 156/73.5 |
| 4,514,242 | 4/1985 | MacLaughlin et al. | 156/73.5 |
| 4,529,115 | 7/1985 | Renshaw et al. | 228/1.1 |
| 5,240,166 | 8/1993 | Fontana, Jr. et al. | 228/111.5 |

FOREIGN PATENT DOCUMENTS

| | | |
|---|---|---|
| 0 367 705 A3 | 5/1990 | European Pat. Off. . |
| 40 32 192 A1 | 6/1991 | Germany . |
| 0 541 116 | 5/1993 | Germany . |
| 2 271 306 | 4/1994 | United Kingdom . |

OTHER PUBLICATIONS

Abstract of Japan, JP6342830, Matsushita Electric Ind Co Ltd, 13 Dec. 1994.

*Primary Examiner*—James Sells
*Attorney, Agent, or Firm*—Wolf, Greenfield & Sacks, P.C.

[57] ABSTRACT

To stabilize bonding strength by concentrating bonding energy upon members to be bonded together, when an overlapped interface of a plurality of members to be bonded together is to be bonded by ultrasonic vibration, heaters 6 and 7 are caused to generate heat to heat the bonding working portion 3d of a resonator 2, whereby bonding energy generated by ultrasonic vibration and bonding energy generated by heating are provided to the interface so that bonding energy can be concentrated upon the interface without increasing the energy of ultrasonic vibration and bonding strength can be stabilized. Further, when electric heaters are used as the heaters 6 and 7, operationability is improved. Moreover, when heater holes 3e and 3f are formed in the resonator 2 and electric heaters are fitted into the holes 3e and 3f, heater installation work is facilitated. The heater may be provided in the mount.

4 Claims, 6 Drawing Sheets

ULTRASONIC VIBRATION BONDING MACHINE

BACKGROUND OF THE INVENTION

This invention relates to an ultrasonic vibration bonding machine for bonding an overlapped interface of a plurality of members to be bonded together by ultrasonic vibration.

As disclosed in Japanese Patent publication No. 23349/1979, for example, there is known an ultrasonic vibration bonding machine in which a resonator is connected to an output end of a transducer for generating ultrasonic vibration, a mount is moved a predetermined distance in a direction that it approaches a bonding working portion of the resonator, an overlapped interface of a plurality of members to be bonded together is pressure held between the bonding working portion provided in the resonator and the mount, and ultrasonic vibration is transmitted from the transducer to the bonding working portion so as to bond overlapped surfaces of the interface.

In the above ultrasonic vibration bonding machine, such a problem has been indicated that, when pressure for holding the members to be bonded together cannot be increased due to the physical properties such as shape and material of the members to be bonded together, the concentration of bonding energy upon the overlapped members to be bonded together deteriorates and hence, fluctuations in bonding strength are liable to occur.

In this case, although it is conceivable to increase the energy of ultrasonic vibration to stabilize bonding strength, an auxiliary facility becomes bulky, making it difficult to employ this method.

SUMMARY OF THE INVENTION

It is therefore an object of the present invention to provide an ultrasonic vibration bonding machine in which members to be bonded together are held between a resonator and a mount and heat is provided to these members to concentrate bonding energy upon the members without increasing the energy of ultrasonic vibration so as to stabilize bonding strength and improve quality and reliability.

An ultrasonic vibration bonding machine according to the present invention claimed in claim 1 in which an overlapped interface of a plurality of members to be bonded together is mounted on a mount, one or both of the mount and a resonator connected to an output end of an transducer for generating ultrasonic vibration is or are moved in a direction that they approach each other, the interface is pressure held between a bonding working portion provided in the resonator and the mount, ultrasonic vibration is transmitted to the bonding working portion of the resonator from the transducer to bond the overlapped surfaces of the interface, is characterized in that a heater is provided in one or both of the resonator and the mount.

According to the constitution of claim 1, when the overlapped interface of the plurality of members to be bonded together is bonded by ultrasonic vibration, the heater is caused to generate heat and the members are held between the resonator and the mount, whereby both of bonding energy generated by ultrasonic vibration and bonding energy generated by heating are provided to the interface of the members by heating the members to be bonded together. Therefore, bonding strength can be stabilized without increasing the energy of ultrasonic vibration by concentrating bonding energy upon the interface.

An ultrasonic vibration bonding machine according to the present invention claimed in claim 2 is characterized in that the heater of claim 1 is an electric heater.

2

According to the constitution of claim 2, since the heater is an electric heater, operationability is improved.

An ultrasonic vibration bonding machine according to the present invention claimed in claim 3 is characterized in that a heater hole is formed in the resonator of claim 1 and an electric heater is fitted into this hole.

According to the constitution of claim 3, since the heater hole is formed in the resonator and the heater is fitted into this hole, heater installation work is facilitated.

An ultrasonic vibration bonding machine according to the present invention claimed in claim 4 is characterized in that the heater of claim 1 is a hot air blower.

According to the constitution of claim 4, since the heater is a hot air blower, the heater can be arranged around the resonator without contact and the state of ultrasonic vibration can be kept satisfactory with ease.

The above and other objectives, features and advantages of the invention will become more apparent from the following description when taken in conjunction with the accompanying drawings.

DESCRIPTION OF THE PREFERRED EMBODIMENT

Figures 1A, 1B, 1C:
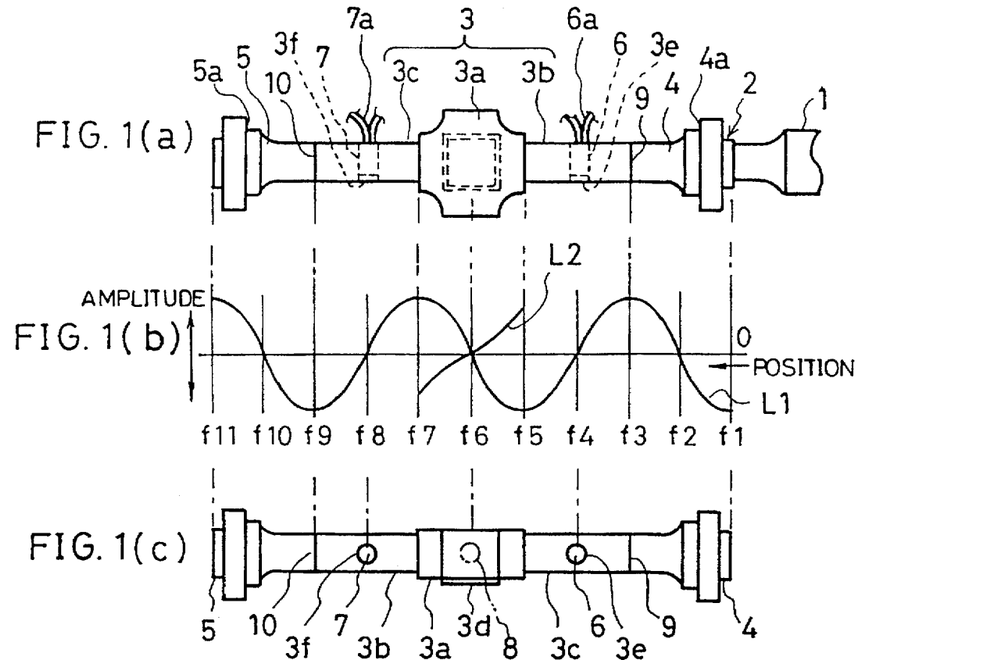
FIG. 1a is a plan view of Embodiment 1 of the transducer and the resonator.
FIG. 1b is a diagram showing the waveform of ultrasonic vibration.
FIG. 1c is a side view of the transducer and the resonator.

FIG. 1 is a schematic diagram showing the positional relationship between an transducer, a resonator and ultrasonic vibration according to Embodiment 1 of the present invention. In FIG. 1, the transducer 1 is an electro-acoustic transducer or electric vibration transducer for converting electric energy into mechanical energy and formed of a piezoelectric element, a magnetostriction element or the like, which generates and outputs vibration of a vertical ultrasonic wave having a predetermined frequency with electric energy supplied from an unshown ultrasonic wave generator. To an output end of the transducer 1 is connected coaxially a resonator 2 by unshown headless screws and unshown screw holes. The resonator 2 is as long as 5/2 the wavelength of the resonance frequency to provide six maximum vibration amplitude points f1, f3, f5, f7, f9 and f11 and five minimum vibration amplitude points f2, f4, f6, f8 and 10 when it resonates with ultrasonic vibration transmitted from the transducer 1 as a vertical wave at a predetermined frequency.

In this embodiment, the resonator 2 comprises a bar-shaped ultrasonic horn 3 made of an alloy such as a titanium alloy and two bar-shaped boosters 4 and 5 made of titanium, aluminum or hardened iron. The two boosters 4 and 5 are connected to both sides of the ultrasonic horn 3 by unshown headless screws and unshown screw holes in such a manner that they are coaxial with the ultrasonic horn 3. The ultrasonic horn 3 is as long as 3/2 the wavelength from the maximum vibration amplitude point f3 to the maximum vibration amplitude point f9 and comprises a cross-shaped, when seen from the plane, vibration conversion portion 3a and two horn portions 3b and 3c connected to both sides of the conversion portion 3a by unshown headless screws and unshown screw holes in such a manner that they are coaxial with the conversion portion 3a. The vibration conversion portion 3a converts ultrasonic vibration transmitted from the transducer 1 in a straight direction and a direction perpendicular to the direction and has a ring-shaped bonding working portion 3d on the cross-shaped under surface thereof around the minimum vibration amplitude point f6. The bonding working portion 3d provides combined vibration energy of ultrasonic vibration in a straight direction and ultrasonic vibration in a perpendicular direction to the interface Wa (see FIG. 3).

The ultrasonic horn 3 comprises heaters 6 and 7 at portions other than the bonding working portion 3d. The heaters 6 and 7 are electric heaters for converting electric energy into heat energy. For example, the heater incorporates in a metal case an electrically insulated member for converting electric energy into heat energy and electric wires 6a and 7a projecting outside from the case and is attached to the resonator 2 by inserting the case into respective holes 3e and 3f formed in the horn portions 3e and 3f in a direction that they are parallel to the under surface at the minimum vibration amplitude points f4 and f8, respectively.

When the resonator 2 is to be attached to an ultrasonic vibration bonding machine shown in FIG. 3 to be described later, the heater holes 3e and 3f are open to the rear surface located on the ultrasonic vibration bonding machine side of the ultrasonic horn 3. When the cases of the heaters 6 and 7 are inserted into the heater holds 3e and 3f from the openings, the electric wires 6a and 7a do not interfere the bonding work. In this case, though the heater holes 3e and 3f which are open or closed on the front surface side can be applied, when the holes which are closed on the front surface side are used, the radiation rate of heat generated by the heaters 6 and 7 to the outside of the ultrasonic horn 3 from the opening on the front surface side is reduced and the transmission coefficient of heat from the heaters 6 and 7 to the ultrasonic horn 3 is improved. Thus the bonding working portion 3d can be suitably heated with small heating energy of the heaters 6 and 7.

Since the minimum vibration amplitude point f6 is located at the vibration conversion portion 3a, when a single heater similar to the heaters 6 and 7 is provided in the vibration conversion portion 3a as shown by a virtual line in FIG. 1c in place of the heaters 6 and 7 provided in the horns 3b and 3c, heat can be stably provided to the bonding working portion 3d.

The booster 4, one of the above two boosters 4 and 5, is as long as ½ the wavelength from the maximum vibration amplitude point f1 to the maximum vibration amplitude point f3 and the other booster 5 is as long as ½ the wavelength from the maximum vibration amplitude point f9 to the maximum vibration amplitude point f11. The connection surfaces 9 and 10 between the booster 4 and the ultrasonic horn 3 and between the booster 5 and the ultrasonic horn 3 are located at the maximum vibration amplitude points f3 and f9, respectively. Support portions 4a and 5a are provided on the boosters 4 and 5 in such a manner that they project outward from the peripheral surfaces of the boosters 4 and 5 in a radial direction and are coaxial with the boosters 4 and 5, respectively.

Instantaneous displacements of ultrasonic vibration generated by the resonator 2 which resonates with ultrasonic vibration from the transducer 1 are indicated by waveforms drawn by solid lines L1 and L2. The waveform shown by a solid line L1 indicates ultrasonic vibration which is transmitted from the transducer 1 and caused to go straight by the vibration conversion portion 3a and the waveform shown by a solid line L2 indicates ultrasonic vibration whose direction is converted into a perpendicular direction by the vibration conversion portion 3a. It has already been elucidated by the theory of ultrasonic wave that displacement of stress generated within the resonator 2 along with the displacement of ultrasonic vibration is such that the maximum vibration amplitude points f1, f3, f5, f7, f9 and f11 become the minimum stress points and the minimum vibration amplitude points f2, f4, f6, f8 and f10 become the maximum stress points.

Figures 2A, 2B:
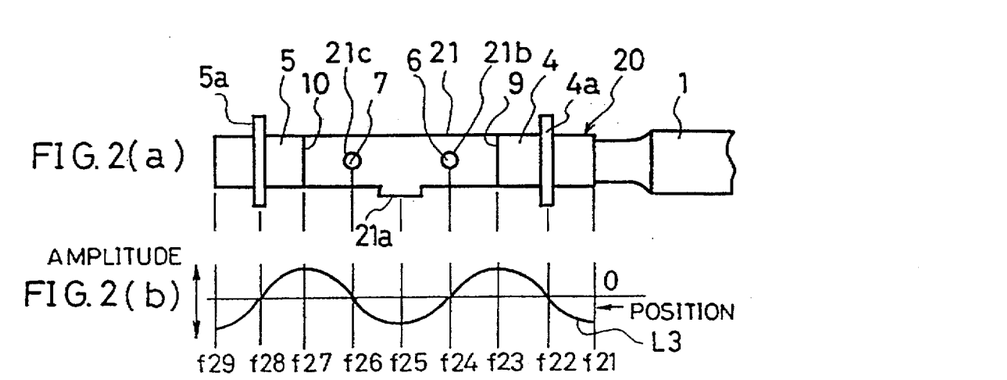
FIG. 2a is a side view of Embodiment 2 of the transducer and the resonator and FIG. 2b is a diagram showing the waveform of ultrasonic vibration.

FIG. 2 is a schematic diagram showing the positional relationship among a transducer, a resonator and ultrasonic vibration according to Embodiment 2 of the present invention. In FIG. 2, a resonator 20 connected to the transducer 1 comprises two boosters 4 and 5 similar to those of Embodiment 1, which are connected to both sides of a bar-shaped ultrasonic horn 21 made of an alloy such as a titanium alloy by unshown headless screws and screw holes in such a manner that they are coaxial with the ultrasonic horn 21 and is as long as 2 times the wavelength of a resonance frequency to provide five maximum vibration amplitude points f21, f23, f25, f27 and f29 and four minimum vibration amplitude points f22, f24, f26 and f28.

In this Embodiment, the ultrasonic horn 21 is as long as the wavelength from the maximum vibration amplitude point f23 to the maximum vibration amplitude point f27 and a bonding working portion 21a is provided at a center portion of the ultrasonic horn 21 in such a manner that it is located at the maximum vibration amplitude point f25 and projects outward from the peripheral surface of the ultrasonic horn 21 in a radial direction.

The ultrasonic horn 21 comprises heaters 6 and 7 similar to those of Embodiment 1 at portions other than the bonding working portion 21a. The heaters 6 and 7 are inserted into heater holes 21b and 21c which are formed in the ultrasonic horn 21 in a direction that they are parallel to the under surface at the minimum vibration amplitude points f24 and f26 like Embodiment 1, respectively.

Instantaneous displacement of ultrasonic vibration generated by the resonator 20 is indicated by a waveform drawn by a solid line L3.

Figure 3:
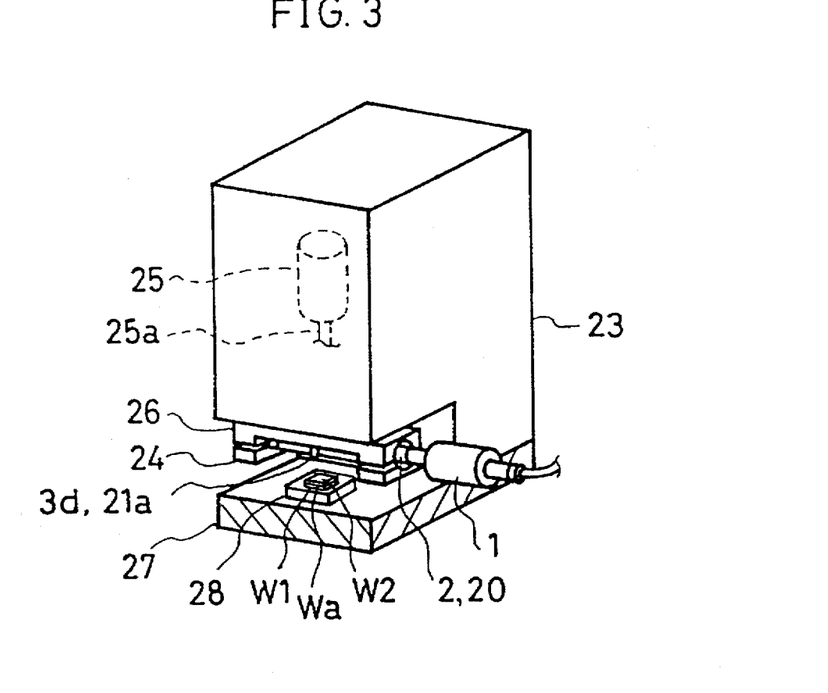
FIG. 3 is a perspective view of an ultrasonic vibration bonding machine according to Embodiment 3 of the present invention.

FIG. 3 is a perspective view of an ultrasonic vibration bonding machine according to Embodiment 3 which uses the resonator 2 of Embodiment 1 or the resonator 20 of Embodiment 2. In FIG. 3, a main body 23 has a working space 24 which is open in forward, right and left directions at a front lower portion thereof and an air cylinder 25 inside an upper portion thereof for defining an upper portion of the working space 24. A holder 26 is installed at a lower end of a piston rod 25a projecting downward from the air cylinder 25. The holder 26 holds the resonator 2 or the resonator 20 connected to the transducer 1 from both sides thereof in such a manner that it is laid in an upper inside portion of the working space 24.

A lower portion of the main body 23 for defining a rear portion of the working space 24 is set on a batholith 27 which constitutes a base for setting the ultrasonic vibration bonding machine in a production line, for example. A mount 28 for mounting an overlapped interface Wa of a plurality of members W1 and W2 to be bonded together is installed on top of the base 27. The mount 28 is arranged at a lower inner portion of the working space 24 in such a manner that it is coaxial with the piston rod 25a and the bonding working portion 3d or 21a in a vertical direction. The top surface of the mount 28 faces the under surface of the bonding working portion 3d or 21a in parallel with predetermined spacing therebetween in a vertical direction when the piston rod 25a stops at the upper limit position.

According to the constitution of this embodiment, by switching the air supply path of an unshown pressurized air supply circuit, the piston rod 25a of the air cylinder 25 contracts, the bonding working portion 3d or 21a moves up a predetermined distance in a direction perpendicular to the transmission direction of ultrasonic vibration from the transducer 1 to the resonator 2 or 20 and a direction that it parts from the mount 28 in an upward direction, the piston rod 25a stops contracting, and the bonding working portion 3d or 21a stops at the upper limit position, whereby a predetermined space for taking in and out the members W1 and W2 to be bonded together is formed between the under surface of the bonding working portion 3d or 21a and the top surface of the mount 28. While the bonding working portion 3d or 21a stops at the upper limit position, the members W1 and W2 are mounted in the bonding working area on the top of the mount 28 while they are placed one upon another.

During the step in which the piston rod 25a expands and stops at the upper limit position by switching the air supply path of the pressurized air supply circuit, the interface Wa of the members W1 and W2 to be bonded together is pressure held between the bonding working portion 3d or 21a and the mount 28.

Either after or prior to the pressure holding of the interface Wa, electric energy is supplied from the ultrasonic wave generator to the transducer 1 to generate ultrasonic vibration and electric energy is supplied to the heaters 6 and 7 to generate heat at the same time. The resonator 2 or 20 resonates with ultrasonic vibration from the transducer 1 and the bonding working portion 3d or 21a vibrates with the maximum vibration amplitude in a direction perpendicular to the direction of applying pressure by the air cylinder 25 and is heated by the heaters 6 and 7 from side thereof. Thereby bonding energy which is the total of heat generated by ultrasonic vibration and heat from the heaters 6 and 7 is concentrated upon the overlapped surfaces of the interface Wa. Therefore, the overlapped surfaces are non-fusion bonded together suitably in a short period of time without increasing the energy of ultrasonic vibration in particular and pressure force.

In this embodiment, since support portions 4a and 5a are provided on both sides of the bonding working portion 3d at the minimum vibration amplitude points f2 and f8 or f22 and f28, respectively, part of energy of ultrasonic vibration transmitted from the transducer 1 to the bonding working portion 3d of the resonator 2 or the bonding working portion 21a of the resonator 20 is not consumed by the support portions 4a and 5a and is transmitted from the transducer 1 to the bonding working portion 3d or 21a very efficiently. Therefore, the bonding strength of the bonding working portion 3d or 21a is stabilized without fluctuations and the incidence of bonding failure greatly decreases.

After the completion of the bonding of the interface Wa, during the step in which the air cylinder 25 contracts by switching the air supply system of an air supply circuit and the bonding working portion 3d or 21a stops at the upper limit position from the lower limit position, the pressure holding of the interface Wa between the bonding working portion 3d or 21a and the mount 28 is released, the bonding working portion 3d or 21a then parts from the top member W, and the plurality of members W1 and w2 which have been bonded together through the interface Wa are taken out from the predetermined space formed between the mount 28 and the bonding working portion 3d or 21a, whereby the bonding step is completed.

Figure 4A:
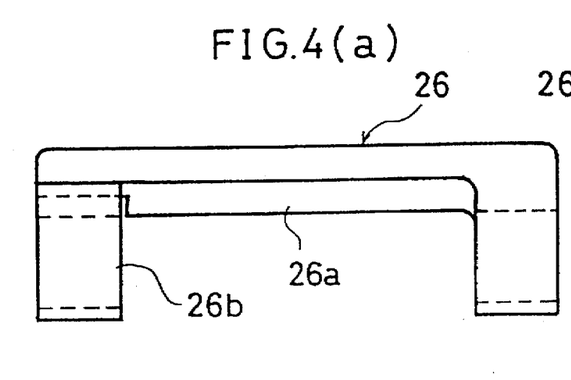
FIG. 4a is a front view of Embodiment 3 and FIG. 4b is a side view.
Figure 4B:
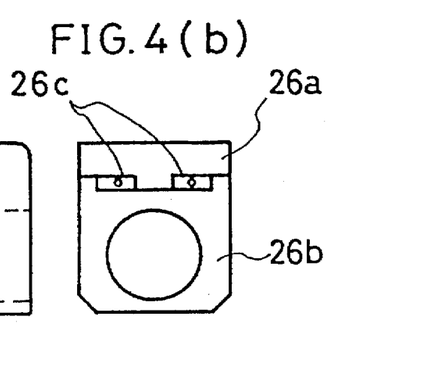

When the resonator 2 or 20 is supported by the holder 26 from both sides like Embodiment 3, a holder arm 26b is separated from the main body 26a of the holder 26 like Embodiment 4 shown in FIG. 4 and is slidably attached to the main body 26aby a guide mechanism such as a cross roller 26c in such a manner that it can slide along the axial direction of the resonator 2 or 20. Since part of the holder 26 is made movable in this way and the expansion and contraction of the resonator 2 or 20 caused by heat transmitted from the heaters 6 and 7 are absorbed, the energy loss of ultrasonic vibration can be reduced.

A description is subsequently given of a combination of a ultrasonic horn in various shapes and heaters with reference to FIGS. 5 to 8. Ultrasonic horns 30, 32, 34 and 36 according to Embodiments 4 to 7 shown in FIGS. 5 to 8 are bar-shaped, made of an alloy such as a titanium alloy, and as long as ½ the wavelength of the frequency of ultrasonic vibration shown by virtual lines in these figures.

Figure 5:
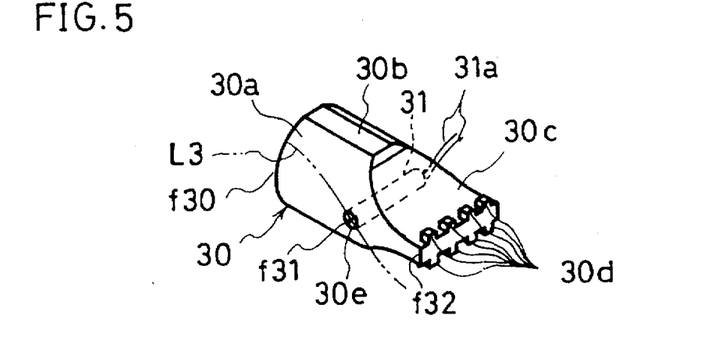
FIG. 5 is a perspective view of Embodiment 5 of the present invention.

The ultrasonic horn 30 of Embodiment 5 shown in FIG. 5 has upper and lower flat portions 30b for a fastening tool in a cylindrical portion 32a ranging from the maximum vibration amplitude point f30 to the minimum vibration amplitude point f31, an inclination portion 30c which inclines gradually toward the reference line (zero line) of vibration amplitude from the flat portions 30 at a section from the minimum vibration amplitude point f31 to the maximum vibration amplitude point f32, a plurality of rectangular bonding working portions 30d arranged in an array, spaced from one another and projecting upward and downward from the inclination portion 30c at the maximum vibration amplitude point f32, and a heater 31 like an electric heater inserted into a heater hole 30e in a direction parallel to the bonding working portion 30d at the minimum vibration amplitude point f31. Reference symbol 31a is an electric wire of the heater 31.

Figure 6:
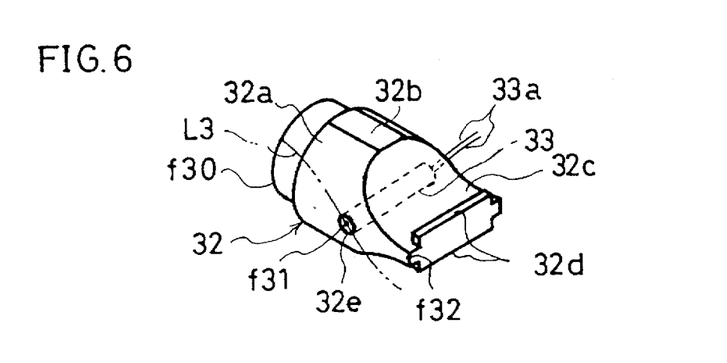
FIG. 6 is a perspective view of Embodiment 6 of the present invention.

The ultrasonic horn 32 of Embodiment 6 shown in FIG. 6 has upper and lower flat portions 32b for a fastening tool in the cylindrical portion 32a ranging from the maximum vibration amplitude point f30 to the minimum vibration amplitude point f31, an inclination portion 32c which inclines gradually toward the reference line (zero line) of vibration amplitude from the flat portions 32b at a section from the minimum vibration amplitude point f31 to the maximum vibration amplitude point f32, a rectangular bonding working portion 32d projecting upward and downward from the inclination portion 32c at the maximum vibration amplitude point f32, and a heater 33 like an electric heater inserted into a heater hole 32e in a direction parallel to the bonding working portion 32d at the minimum vibration amplitude point f31. Reference symbol 33a is an electric wire of the heater 33.

In the case of the bonding working portion 30d or 32d having a large width as in Embodiments 4 and 5, when the heater 31 or 33 is provided in the ultrasonic horn 30 or 32 in parallel to the projecting direction of the bonding working portion 30d or 32d, appropriate bonding can be achieved by suppressing fluctuations in the vibration amplitude of the ultrasonic horn 30 or 32. The ultrasonic horn 34 of Embodiment 7 shown in FIG. 7 has a recess portion 34b for a fastening tool in a cylindrical portion 34a ranging from the maximum vibration amplitude point f30 to the minimum vibration amplitude point f31, an inclination portion 34d for connecting a prismatic portion 34c ranging from the minimum vibration amplitude point f31 to the maximum vibration amplitude point f32 to the cylindrical portion 34a smoothly, a rectangular bonding working portion 34e projecting from the prismatic portion 34c in a transverse direction at the maximum vibration amplitude point f32, and a heater 35 like an electric heater inserted into a heater hole 34f in a direction parallel to the bonding working portion 34d at the minimum vibration amplitude point f31. Reference symbol 35a is an electric wire of the heater 35.

Figure 8:
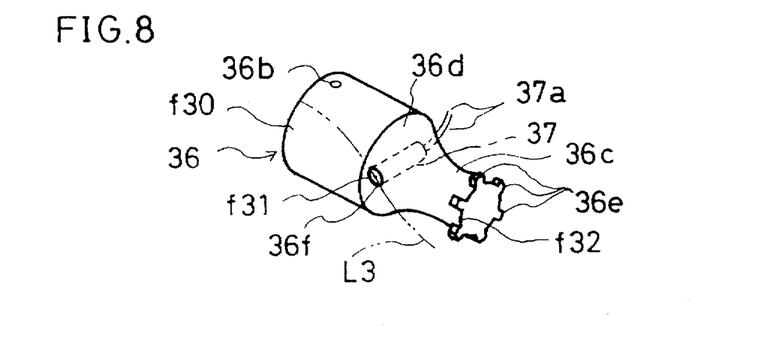
FIG. 8 is a perspective view of Embodiment 8 of the present invention.

The ultrasonic horn 36 of Embodiment 8 shown in FIG. 8 has a recess portion 36b for a fastening tool in a large cylindrical portion 36a ranging from the maximum vibration amplitude point f30 to the minimum vibration amplitude point f31, an inclination portion 36d for connecting a small cylindrical portion 36c ranging from the minimum vibration amplitude point f31 to the maximum vibration amplitude point f32 to the cylindrical portion 36a smoothly, a plurality of rectangular bonding working portions 36e projecting from the cylindrical portion 36c in a radial direction at the maximum vibration amplitude point f32 and arranged in a circumferential direction with spacing therebetween, and a heater 37 like an electric heater inserted into a heater hole 36f in a direction parallel to the bonding working portions 36e at the minimum vibration amplitude point f31. Reference symbol 37a is an electric wire of the heater 37.

Figure 7:
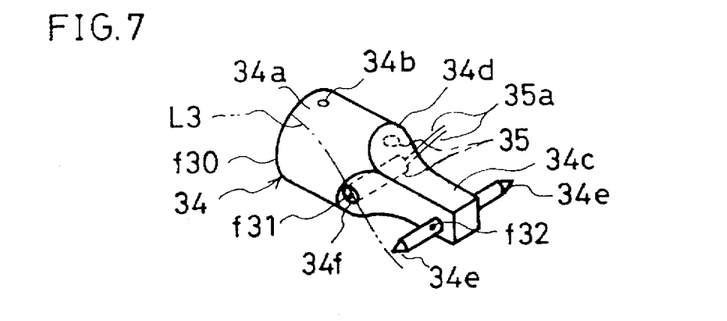
FIG. 7 is a perspective view of Embodiment 7 of the present invention.

In the case of the bonding working portion 34e or 36e having a small width as in Embodiments 6 and 7, even when the heater 35 or 37 is provided in the ultrasonic horn 36 or 36 independent of the projecting direction of the bonding working portion 34e or 36e as shown by a virtual line in FIG. 7, appropriate bonding can be achieved without fluctuations in the vibration amplitude of the ultrasonic horn 34 or 36.

Figure 9:
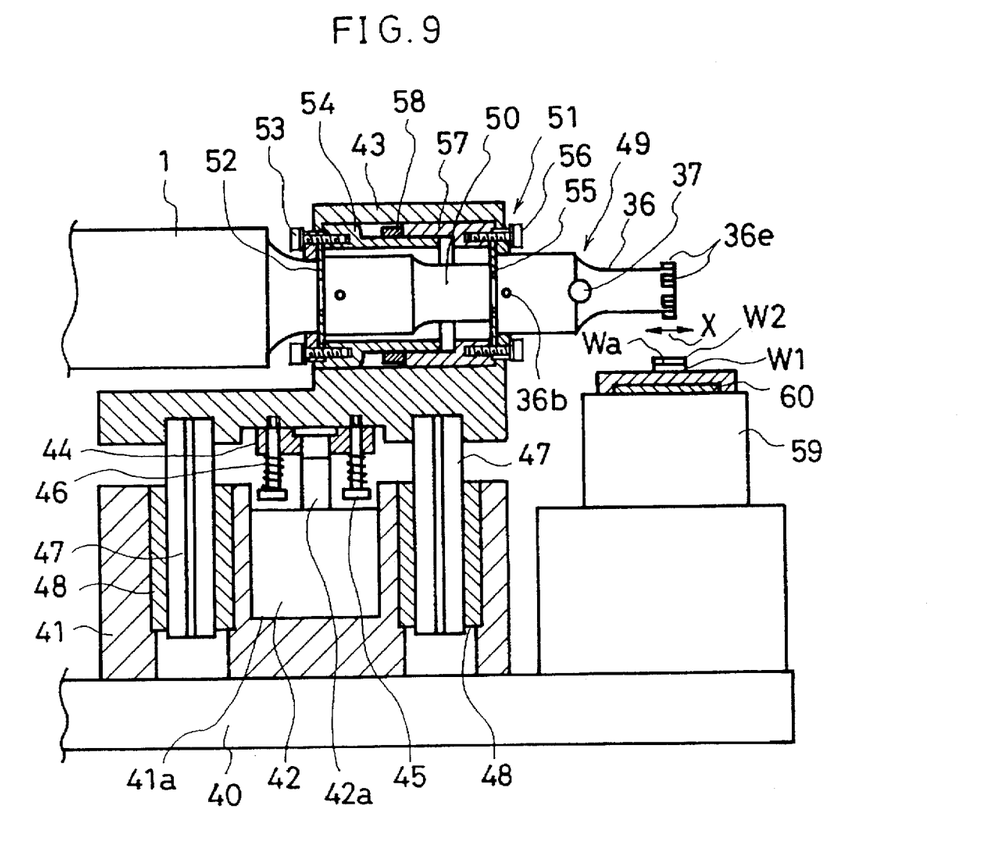
FIG. 9 is a partially broken side view of Embodiment 9 of the present invention.
Figure 10:
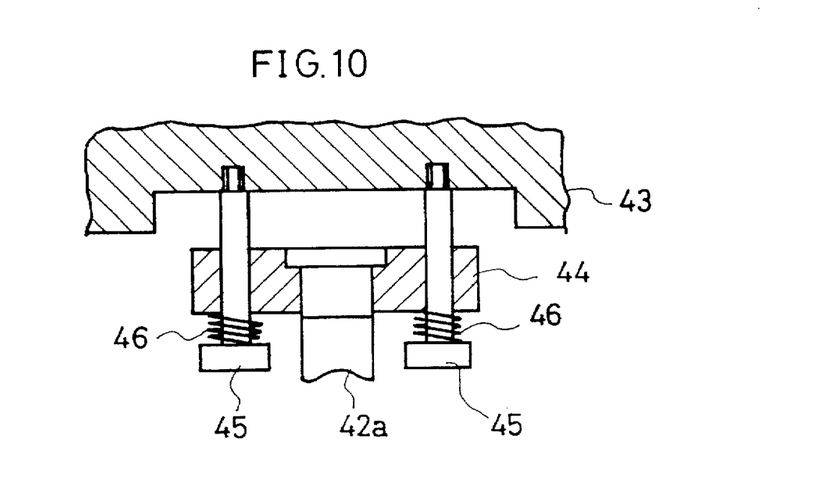
FIG. 10 is an enlarged partial sectional view of Embodiment 9 of the present invention.

FIGS. 9 and 10 show an ultrasonic vibration bonding machine according to Embodiment 9 which uses one of the resonators 30, 32, 34 and 36 of Embodiments 5 to 8. In FIG. 9, a main body 40 has a base portion 41 of a pressuring mechanism on a half portion thereof. A recess portion 41a formed on the top of the base portion 41 contains an air cylinder 42 as a pressurizing source. A piston rod 42a which is installed on the top of the air cylinder 42 is connected to a holder 43. In this embodiment, an upper end of the piston rod 42a is attached to a movable piece 44 arranged below the holder 43 in such a manner that it cannot be pulled down out of the movable piece 44. The movable piece 44 is fitted with guide rods 45 fixed to the under surface of the holder 43 in such a manner that it can move vertically, and is pressed upward by elastic materials 46 such as coil springs installed between lower end portions of the guide rods 45 projecting from the movable piece 44 and the movable piece 44. On right and left sides of the movable piece 44, guide shafts 47 formed of spline shafts are attached to the under surface of the holder 43 in such a manner that they face downward. Each of the guide shafts 47 is fitted in and is in slide contact with a guide bush 48 attached to the base portion 41 for the guide shaft so that it can move vertically. A resonator 49 connected to the transducer 1 is mounted on top of the holder 43. The resonator 49 comprises the resonator 36, for example, one of the resonators 30, 32, 34 and 36 of Embodiments 5 to 8, and a booster 50. The booster 50 is incorporated in a vibration insulating support member 51 whose length is adjustable. The vibration insulating support member 51 stores the booster 50 within a first housing 54 to which a first diaphragm 52 is attached by screws 53 and stores a portion of the booster 50 projecting from the first housing 54 within a second housing 57 to which a second diaphragm 55 is attached by screws 56. The second housing 57 is screwed to the first housing 54 coaxially. When the front and rear ends of the booster 50 contact the first diaphragm 52 and the second diaphragm 55, a nut 58 fitted in the first housing 54 is fastened in a direction that it approaches the second housing 57, and this nut 58 and the second housing 57 which functions as a nut for the first housing 54 are bound tightly so as to adjust the total length of the vibration insulating support member 51 to be fitted to the booster 50. The transducer 1 is connected to a rear end of the booster 50 stored within the vibration insulating support member 51 coaxially through the first diaphragm 52 by unshown headless screws and unshown screw holes and the ultrasonic horn 36 is connected to a front end of the booster 50 coaxially through the second diaphragm 55 by unshown headless screws and unshown screw holes. Thereafter, the vibration insulating support member 51 is mounted on top of the holder 43 so that the transducer 1 and the resonator 49 are arranged in the holder 43 as shown in FIG. 9. At the front of the base portion 41, a mount 59 is provided on the main body 40. The mount 59 has a heater 60 which is an electric heater inside the uppermost portion thereof for mounting the members W1 and w2 to be bonded together.

According to the constitution of this embodiment, by the expansion of the air cylinder 42, the bonding working portion 36e is moved up a predetermined distance in a direction perpendicular to the transmission direction of ultrasonic vibration from the transducer 1 to the resonator 49 and in a direction that it parts from the mount 59 in an upward direction. Thereafter, the expansion of the air cylinder 42 is stopped to form a predetermined space for taking in and out the members W1 and W2 to be bonded together between the under surface of the bonding working portion 36e and the top surface of the mount 59. In this state, the members W1 and W2 to be bonded together are mounted in the bonding working area on top of the mount 59 while they are placed one upon another. When the bonding working portion 36e contacts the members W1 and W2 during the step in which the air cylinder 42 contracts and stops at the lower limit position, as shown in FIG. 10, the movable piece 44 compresses the elastic member 46 and moves down and hence, the elastic member 46 absorbs the impact energy of the bonding working portion 36e on the members W1 and W2. Thereafter, the interface Wa is pressure held between the bonding working portion 36e and the mount 59.

Either after or prior to the pressure holding of the interface Wa, electric energy is supplied to the transducer to an unshown ultrasonic wave generator to generate ultrasonic vibration and electric energy is also supplied to the heaters 37 and 60 to generate heat. Supply of electric energy for oscillating the transducer 1 may be carried out as follows, for example. An unshown sensor is provided in the holder 43 and a dock is provided in the movable piece 44 so that the sensor detects the dock when the elastic material 46 is compressed by a predetermined amount as shown in FIG. 10 and supply of electric energy to the transducer 1 from the ultrasonic wave generator is started by the detection signal to oscillate the transducer 1. As for supply of electric energy to the heaters 37 and 60, since heat generation of the heaters 37 and 60 is not stabilized in a short period of time, if electric energy is supplied continuously in response to the start of continuous bonding work, heat generation of the heaters 37 and 60 can be suitably stabilized for bonding work. The resonator 49 resonates with ultrasonic vibration from the transducer 1, and the bonding working portion 36e vibrates with the maximum vibration amplitude in a direction shown by an arrow X perpendicular to the pressurizing direction by the air cylinder 42 and is heated by the heaters 37 and 60 from side thereof. Thereby combined bonding energy of heat generated by ultrasonic vibration and heat coming from the heaters 37 and 60 is concentrated upon the overlapped surfaces of the interface Wa. As a result, the overlapped surfaces are non-fusion bonded together suitably in a short period of time without increasing the energy of ultrasonic vibration and pressure force.

Figure 11:
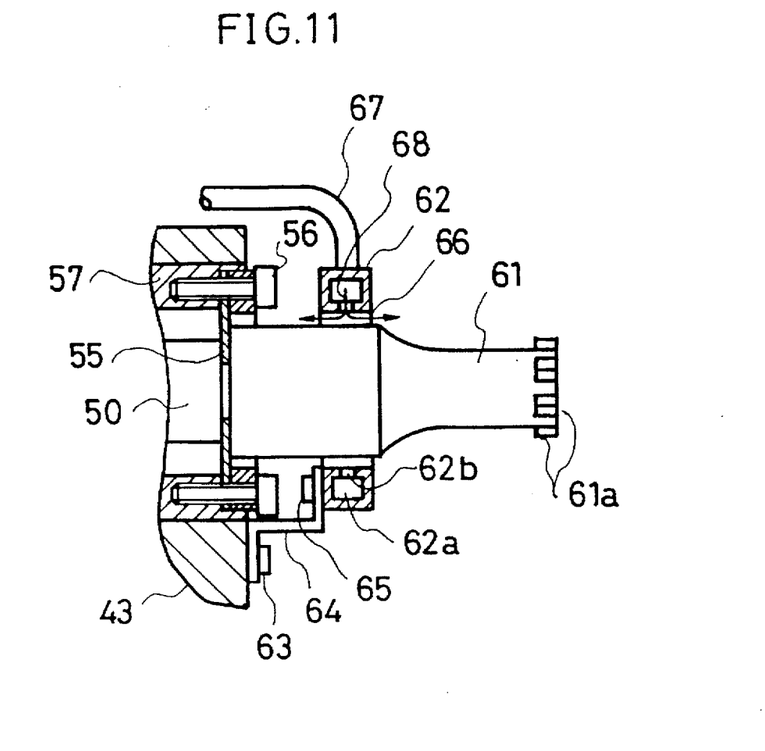
FIG. 11 is a sectional view of Embodiment 10 of the present invention.
Figure 12:
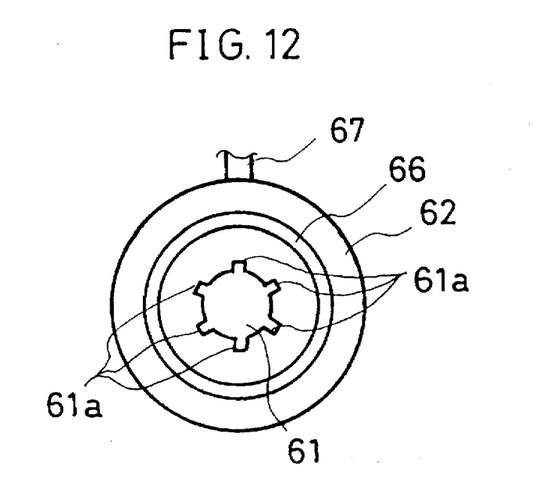
FIG. 12 is a right side view of Embodiment 10 of the present invention.

FIGS. 11 and 12 show Embodiment 10 in which a heater 62 for heating with hot air is provided around an ultrasonic horn 61. The ultrasonic horn 61 is the same as the ultrasonic horn 36 shown in FIG. 8 except that the heater 37 and the heater hole 36f are excluded and a bonding working portion 61a corresponding to the bonding working portion 36e is provided and is incorporated in the holder 43 of the ultrasonic vibration bonding machine shown in FIG. 9. The heater 62 is a closed ring-shaped pipe surrounding the ultrasonic horn 61 without contact, inside of which an endless passage 62a is formed and an air outlet 62b is formed continuously in the inner wall facing the ultrasonic horn 61 of the pipe in an entire circumferential direction. The heater 62 is attached by a screw 65 to an end of a stay 64 installed on the holder 43 by a screw 63. When the heater 62 is to be attached to the stay 64, the heater is arranged coaxial with the ultrasonic horn 61 to form a predetermined space 66 between the heater 62 and the ultrasonic horn 61. A hose 67 connected to the air outlet of a hot air generation source such as a blower equipped with an unshown electric heater is connected to part of the outer wall of the heater 62. Hot air 68 is introduced from the hose 67 into the endless passage 62a in such a manner that it circulates in a circumferential direction and is blown uniformly against the outer wall of the ultrasonic horn 61 from the air outlet 62b from the endless passage 62a so that the ultrasonic horn 61 is heated by the blown hot air 68 from side thereof.

Figure 13:
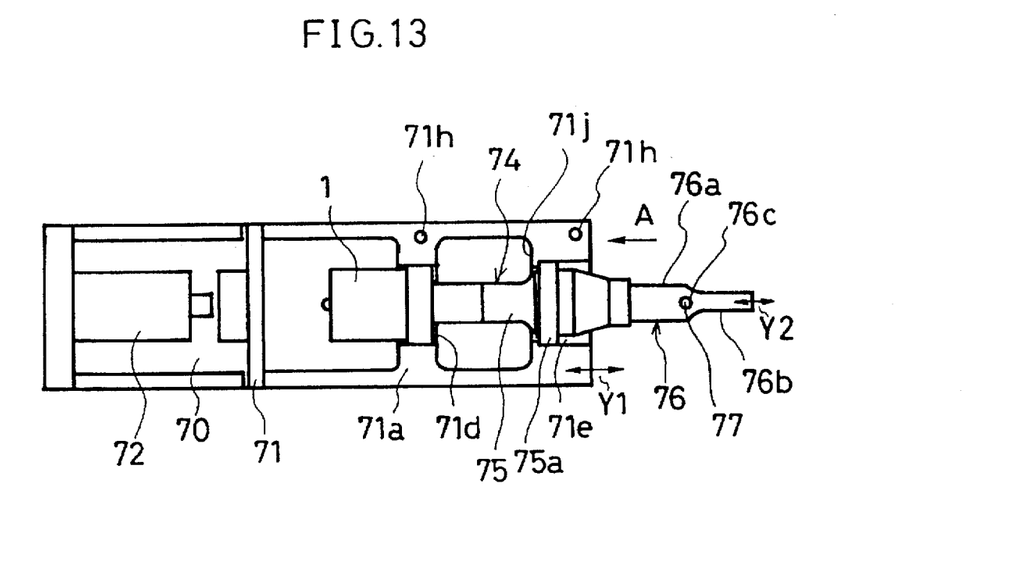
FIG. 13 is a side view of Embodiment 11 excluding a portion.
Figure 14:
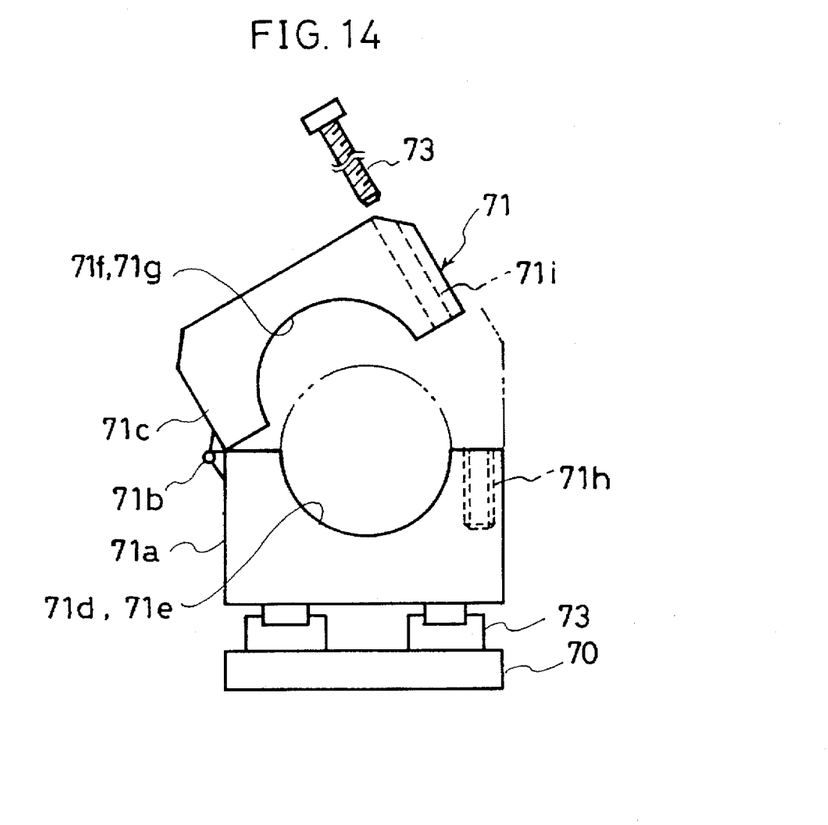
FIG. 14 is an under view of FIG. 11 seen from a direction shown by an arrow A.

FIGS. 13 and 14 shows an ultrasonic vibration bonding machine according to Embodiment 11 in which members which are made of a polymer compound such as a thermoplastic synthetic resin are bonded together by ultrasonic vibration. FIG. 13 shows a resonator 74 installed in a holder 71 by removing part of the holder 71, and FIG. 14 shows Embodiment 11 excluding the resonator 74 when seen from a direction shown by an arrow A in FIG. 13. In these figures, the holder 71 attached to a main body 70 is driven vertically in a direction shown by an arrow Y1 by an air cylinder 72 attached to the main body 70 and guided along a guide mechanism 73 such as a cross roller installed between the main body 70 and the holder 71. The holder 71 comprises a holder portion 71a on the side of the guide mechanism and an open/close holder portion 71c attached to the holder portion 71a by a hinge 71b such that it can be opened or closed. Semi-circular recess portions 71d, 71e, 71f and 71g are formed in the interface between the holder portion 71a on the side of the guide mechanism and the open/close holder portion 71c. The resonator 74 is first stored in the recess portions 71d and 71e of the holder portion 71a on the side of the guide mechanism and the open/close holder portion 71c is then placed upon the holder portion 71a to hold the resonator 75 within the holder 71 by driving a screw 73 into a screw hole 71h formed in the top surface of the holder portion 71a on the side of the guide mechanism from a screw hole 71i formed in the bottom surface of the free end side of the open/close holder portion 71c. The resonator 74 connects a booster 75 to the transducer 1 coaxially by unshown headless screws and unshown screw holes and connects an ultrasonic horn 76 to the booster 75 coaxially by unshown headless screws and unshown screw holes. An intermediate portion of the transducer 1 is held between the recess portions 71d and 71f of the holder 71, a support portion 75a projecting outward coaxially from the booster 75 is held between the recess portion 71e and 71g of the holder 71. A step portion 71j projecting inward from the recess portions 71e and 71g of the holder 71 is installed in the holder 71 so that it can accept s support portion 75a of the booster at the time of bonding work. The ultrasonic horn 76 has a large base portion 76a on the side of the booster and a small bonding working portion 76b extended to the top from the base portion 76a and comprises an electric heater type heater 77 inserted into a heater hole 76c formed at the minimum vibration amplitude point between the base portion 76a and the bonding working portion 76b.

According to the constitution of this embodiment, electric energy is supplied to the transducer 1 from an unshown ultrasonic wave generator to generate ultrasonic vibration, whereby the resonator 74 resonates and the ultrasonic horn 76 vibrates in a direction shown by an arrow Y2, and electric energy is supplied to the heater 77 to generate heat to heat the ultrasonic horn 76 from side thereof. Thus the polymer compounds can be bonded together suitably in a short period of time.

In each of the above embodiments, the ultrasonic horn may be various in shape such as a square bar having a plurality of bonding working portions on top and bottom surfaces in order to adjust the bonding working portion to the material of the member to be bonded and the physical properties such as area and thickness of the interface. Therefore, an ultrasonic horn the most suitable for the physical properties such as shape and material of the members to be bonded may be selected from among these ultrasonic horns.

In each of the above embodiments, the resonator which is directly connected to an output end of the transducer has been illustrated. However, an intermediate booster may be used between the resonator and the transducer to change vibration amplitude at the bonding working portion. This intermediate booster is bar-shaped, as long as multiples of ½ the wavelength and made of titanium, aluminum or hardened iron, and changes the input/output ratio (magnification) of vibration amplitude by the volume ratio of a large diameter portion to a small diameter portion thereof.

L4 shown in FIGS. 5 to 8 is a waveform indicative of instantaneous displacement (vibration amplitude) of ultrasonic vibration caused by resonance.

In each of the above embodiments, the resonance frequency changes according to the stretch of the resonator by heating. Then, according to the rule of thumb based on temperature dependence of resonance frequency, a resonator having a smaller length is manufactured at normal temperature. This resonator having a smaller length is stretched by heating at a predetermined temperature by a heater. As a matter of course, this stretched resonator is caused to resonate with ultrasonic vibration from the transducer so that the resonator can resonate with a predetermined frequency. Though different depending on the material of the resonator, to resonate the resonator with a frequency of 40 KHz when it is heated at a predetermined temperature of 250° C., for example, its length should be adjusted in the production process such that it resonates with a frequency of 41 to 42 KHz at a normal temperature of 25° C.

What is claimed is:

1. An ultrasonic vibration bonding machine for bonding together surfaces of a plurality of members at an overlapped interface, the ultrasonic bonding machine comprising:

a mount having an uppermost portion adapted to receive the plurality of members such that the plurality of members are arranged with the surfaces to be bonded together in contact with each other to create the overlapped interface;

a resonator having a first end, a second end and a bonding working portion disposed between the first and second ends;

a transducer having an output end coupled to one of the first and second ends of the resonator, the transducer generating ultrasonic vibration having a resonant frequency with a corresponding wavelength, the resonator having a length equal to a multiple of ½ the wavelength of the resonant frequency, so that a maximum vibration amplitude point is formed at each of the first and second ends of the resonator and a minimum vibration amplitude point is formed on the resonator between the first and second ends; and a heater disposed to be in contact with one of the uppermost portion of the mount and the minimum vibration point of the resonator;

wherein the bonding machine during operation is adapted to apply pressure to the overlapped interface through the bonding working portion of the resonator and the mount, wherein ultrasonic vibration is transmitted to the bonding working portion of the resonator from the transducer to bond the surfaces of the plurality of members.

2. The ultrasonic vibration bonding machine according to claim 1, wherein the heater is an electric heater and is disposed in a heater hole formed at the minimum vibration amplitude point of the resonator.

3. The ultrasonic vibration bonding machine according to claim 1, wherein the heater is installed in an interior portion of the uppermost portion of the mount.

4. The ultrasonic vibration bonding machine according to claim 1, further comprising a holder main body and right and left holder arms for supporting the resonator at the first and second ends, wherein one of the right and left holder arms is attached to the holder main body in such a manner that the one of the right and left holder arms can slide along an axial direction of the resonator to pressure hold the overlapped interface between the mount and the bonding working portion of the resonator.

\* \* \* \* \*